United States Patent
Barrs, II et al.

(10) Patent No.: US 10,372,993 B2
(45) Date of Patent: Aug. 6, 2019

(54) SELECTIVELY RETAINING HIGH-RESOLUTION SEGMENTS OF CONTINUOUS VIDEO DATA STREAM

(71) Applicant: INTERNATIONAL BUSINESS MACHINES CORPORATION, Armonk, NY (US)

(72) Inventors: John W. Barrs, II, Boca Raton, FL (US); Michael S. Glenn, Round Rock, TX (US); John G. McEachern, Boca Raton, FL (US); Eduardo Mejia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 15/401,375

(22) Filed: Jan. 9, 2017

(65) Prior Publication Data

US 2018/0197014 A1   Jul. 12, 2018

(51) Int. Cl.
*G06K 9/00* (2006.01)
*H04N 19/117* (2014.01)
(Continued)

(52) U.S. Cl.
CPC ..... *G06K 9/00744* (2013.01); *G06K 9/00765* (2013.01); *H04N 19/117* (2014.11);
(Continued)

(58) Field of Classification Search
CPC .... H04N 19/132; H04N 19/162; H04N 19/17; H04N 19/40; H04N 7/18
See application file for complete search history.

(56) References Cited

U.S. PATENT DOCUMENTS

| 6,757,008 B1 | 6/2004 | Smith |
| 8,493,464 B2 * | 7/2013 | Pien .................... H04N 5/2253 348/222.1 |

(Continued)

FOREIGN PATENT DOCUMENTS

| CN | 101917602 A | 12/2010 |
| EP | 2 711 892 A | 3/2014 |
| JP | H-09322154 A | 12/1997 |

OTHER PUBLICATIONS

Connell et al., "Smart Video Surveillance: Exploring the Concept of Multiscale Spatiotemporal Tracking", IEEE Signal Processing Magazine, vol. 22, No. 10, Apr. 2005 (15 pages).

(Continued)

*Primary Examiner* — Tom Y Lu
(74) *Attorney, Agent, or Firm* — Michael Petrocelli, Esq.; Kevin P. Radigan, Esq.; Heslin Rothenberg Farley & Mesiti P.C.

(57) ABSTRACT

Processing of a continuous, high-resolution video data stream for reduced data storage is provided. The processing includes: analyzing the continuous, high-resolution data stream for one or more specified image elements of interest; identifying at least one image element of the one or more specified image elements of interest in the continuous video data stream; passing one or more video segments of the continuous video data stream as high-resolution video, the one or more video segments containing the identified at least one image element of the one or more specified image elements of interest; and reducing resolution of other portions of the continuous video data stream than the one or more video segments to low-resolution video, wherein low-resolution video includes less data than high-resolution video.

20 Claims, 5 Drawing Sheets

(51) Int. Cl.
*H04N 19/17* (2014.01)
*H04N 19/587* (2014.01)
*H04N 19/59* (2014.01)

(52) U.S. Cl.
CPC .......... *H04N 19/17* (2014.11); *H04N 19/587* (2014.11); *H04N 19/59* (2014.11)

(56) References Cited

U.S. PATENT DOCUMENTS

| | | | |
|---|---|---|---|
| 8,564,661 | B2 | 10/2013 | Lipton et al. |
| 8,953,044 | B2 | 2/2015 | Wu et al. |
| 9,756,570 | B1* | 9/2017 | Ramachandra ......... H04W 4/70 |
| 2006/0077256 | A1 | 4/2006 | Silvemail et al. |
| 2006/0203903 | A1* | 9/2006 | Shih ................ G08B 13/19667 375/240.01 |
| 2009/0158315 | A1* | 6/2009 | Bendall .................. H04N 7/185 725/32 |
| 2009/0219387 | A1 | 9/2009 | Marman et al. |
| 2011/0051808 | A1* | 3/2011 | Quast ...................... H04N 7/18 375/240.08 |
| 2014/0218520 | A1* | 8/2014 | Teich ................... H04N 5/2354 348/143 |
| 2014/0375820 | A1 | 12/2014 | Priyantha et al. |
| 2015/0350611 | A1* | 12/2015 | Pearson .................. H04L 67/10 348/158 |

OTHER PUBLICATIONS

IBM, "z/Architecture Principles of Operation," IBM® Publication No. SA22-7832-10, Eleventh Edition, Mar. 2015, pp. 1-1732.
IBM, "Power ISA™ Version 2.07B," International Business Machines Corporation, Apr. 9, 2015, pp. 1-1527.
Mel, Peter and Tim Grance, "The NIST Definition of Cloud Computing," National Institute of Standards and Technology, Information Technology Laboratory, Special Publication 800-145, Sep. 2011, pp. 1-7.

\* cited by examiner

SELECTIVELY RETAINING HIGH-RESOLUTION SEGMENTS OF CONTINUOUS VIDEO DATA STREAM

BACKGROUND

Image resolution may refer to the amount of detail one or more images hold. The term applies to digital images, video images, film images, and other types of images. Higher-resolution means more image detail, while lower-resolution means less image detail. Image resolution can be measured in a number of ways.

For instance, the resolution of a digital camera can be described in terms of pixel resolution, spatial resolution, spectral resolution, and temporal resolution. Pixel resolution refers to the capability of a sensor to observe or measure the smallest object clearly with distinct boundaries. A pixel is a unit of digital resolution depending upon the size of the pixel. Typically, for any given lens setting, the smaller the size of the pixel, the higher the resolution will be, and the clearer the object in the image. Spatial resolution refers to how closely lines can be resolved in an image, and depends on the properties of the system creating the image, and not just the pixel resolution in pixels per inch. In effect, spatial resolution refers to the number of independent pixel values per unit length. Spectral resolution is the ability to resolve spectral features and bands into their separate components.

Temporal resolution may refer to the precision of a video image stream with respect to time. Often, there is a trade-off between temporal resolution and spatial resolution due to the uncertainty principle, which is an inherent property of Fourier transform. Movie cameras and high-speed cameras can resolve events at different points in time. The time resolution used for movies may be 24 to 48 frames per second (frames/s), whereas a high-speed, high-resolution camera may resolve 50-300 frames/s, or even more. As technology continues to progress, high-resolution video cameras producing high-resolution video data streams continue to become more common. While increased video resolution may have advantages in certain situations, the higher-resolution video data results in increased transmit time and increased storage cost when used, for instance, in a security monitoring system.

SUMMARY

The shortcomings of the prior art are overcome and additional advantages are provided through the provision of a computer-implemented method, which includes: analyzing a continuous video data stream for one or more specified image elements of interest, the continuous video data stream being a high-resolution video data stream; identifying, by a processor, at least one image of the one or more specified image elements of interest in the continuous video data stream; passing through one or more video segments of the continuous video data stream as high-resolution video, the one or more video segments containing the identified at least one image element of the one or more specified image elements of interest; and reducing resolution of other portions of the continuous video data stream than the one or more video segments to low-resolution video, wherein low-resolution video includes less data than high-resolution video.

In another aspect, a system for processing video data is provided, which includes a memory, and a processing unit communicatively coupled with the memory. The system performs a method, which includes: analyzing a continuous video data stream for one or more specified image elements of interest, the continuous video data stream being a high-resolution video data stream; identifying at least one image element of the one or more specified image elements of interest in the continuous video data stream; passing through one or more video segments of the continuous video data stream as high-resolution video, the one or more video segments containing the identified at least one image element of the one or more specified image elements of interest; and reducing resolution of other portions of the continuous video data stream than the one or more video segments to low-resolution video, wherein low-resolution video includes less data than high-resolution video.

In a further aspect, a computer program product for processing a video data stream is provided. The computer program product includes a computer-readable storage medium readable by a processing unit and storing instructions for execution by the processing unit for performing a method, including: analyzing a continuous video data stream for one or more specified image elements of interest, the continuous video data stream being a high-resolution video data stream; identifying at least one image element of the one or more specified image elements of interest in the continuous video data stream; passing through one or more video segments of the continuous video data stream as high-resolution video, the one or more video segments containing the identified at least one image element of the one or more specified image elements of interest; and reducing resolution of other portions of the continuous video stream than the one or more video segments to low-resolution video, wherein low-resolution video includes less data than high-resolution video.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

There is a growing interest in using high-resolution digital video cameras in security and surveillance systems. Greater resolution advantageously improves accuracy in identifying people and objects, and offers digital zoom for more detail when desired. Today, many potential users of such security systems are limited due, in part, to the cost in using off-site storage of high-resolution data. For instance, high-resolution video data from a security system may need to be saved for days or even weeks, depending upon the implementation. On-site storage of security video data may be less advantageous, due to the possibility of tampering or intentional destruction of the data. In contrast, low-resolution video data may be more cost effective for off-site storage, but often does not provide the clarity of facial or other images needed to identity, for instance, a person, a vehicle, a license plate, or other item of interest.

Addressing these needs, presented herein is a continuous video imaging security system which advantageously utilizes one or more high-resolution video imaging security cameras, and which selectively performs video processing on the continuous video data stream, for instance, to facilitate more cost effective transmission and/or storage of the video data.

Generally stated, disclosed herein are a computer-implemented method, system, and computer program product form, least in part, processing a continuous video data stream. In one or more aspects, video processing is provided which includes: analyzing a continuous video data stream for one or more specified image elements of interest, the continuous video data stream being a high-resolution video data stream. As explained below, the one or more specified image elements of interest may include one or more elements such as: a facial image, a vehicle, a license plate, a moving object, or other element of interest. In one or more embodiments, a user interface may be provided to enable a user to select the one or more specified image elements of interest, for instance, from a plurality of predefined image elements which may be used in analyzing the continuous video data stream.

The video processing further includes: identifying, by a processor, at least one image element of the one or more specified image elements of interest in the continuous video data stream; and passing through one or more video segments of the continuous video data stream as high-resolution video, the one or more video segments containing the identified at least one image element of the one or more specified image elements of interest. Further, the video processing reduces resolution of other portions of the continuous video data stream than the one or more video segments to low-resolution video, where low-resolution video includes less data than high-resolution video.

For instance, as explained above, video resolution may refer to pixel resolution, spatial resolution, spectral resolution, and/or temporal resolution. Thus, in one or more embodiments, reducing resolution may include, for instance, reducing pixel resolution, reducing spatial resolution, reducing spectral resolution, and/or reducing temporal resolution. For instance, in one or more specific examples, the number of pixels per frame, the number of lines per frame, and the number of frames per second, may each be reduced to achieve low-resolution video in order to facilitate transmission of the video to, for instance, off-site storage, as well as to reduce cost of storage of the video, while still maintaining identified video segments of interest as high-resolution video. Note that in one or more implementations, high-resolution video may be a video segment of defined duration, taken unfiltered from the continuous, high-resolution video data stream being processed.

In one or more implementations, a user interface may be provided to enable a user to select the defined duration for the one or more video segments of the continuous video data stream passing through as high-resolution video. For instance, a user may decide to select a segment duration of 1-10 seconds for high-resolution video containing an identified at least one image element from the one or more specified image elements of interest. In application, the other portions of the continuous data stream may be a majority, such as almost all, of the continuous video data stream being output for storage: that is, a majority of the continuous video data stream may undergo reduction in resolution, with only selected video segments containing the identified image element(s) being retained as high-resolution video.

In one or more implementations, a user interface may be provided to enable a user to specify one or more filter parameters used in the reducing the resolution of the other portions of the continuous video data stream. These one or more user-selectable filter parameters may enable the user to specify how resolution is to be reduced, such as from the group consisting of pixel resolution, spatial resolution, spectral resolution, and temporal resolution, as well as how much, to achieve the desired low-resolution video. For instance, dependent upon storage costs, a user may customize the low-resolution video to achieve a processed data stream with the desired storage cost structure, while still providing the security benefits of the chronologically captured high-resolution video.

In one or more embodiments, the processing may include saving chronologically the one or more video segments of the continuous video data stream as the high-resolution video, and the other portions of the continuous video data stream as the low-resolution video, for a storage duration. Saving of the video may be on-site or off-site, with off-site being advantageous from a security standpoint in certain scenarios. As noted, the security system may further include a user interface that enables, in part, the user to select the storage duration, either alone or in combination with setting the amount of filtering performed in reducing resolution of the other portions of the continuous video data stream. In one or more implementations, the processing may be implemented on-site with the one or more high-resolution video imaging cameras producing the continuous, high-resolution video data stream being processed, for instance, in a common structure containing the video imaging camera(s), or in a separate box connected to the video imaging camera(s). Alternatively, the video processing described herein could be performed remote from, for instance, off-site from, the high-resolution video imaging camera(s) of the continuous video imaging security system monitoring a particular location.

Figure 1:
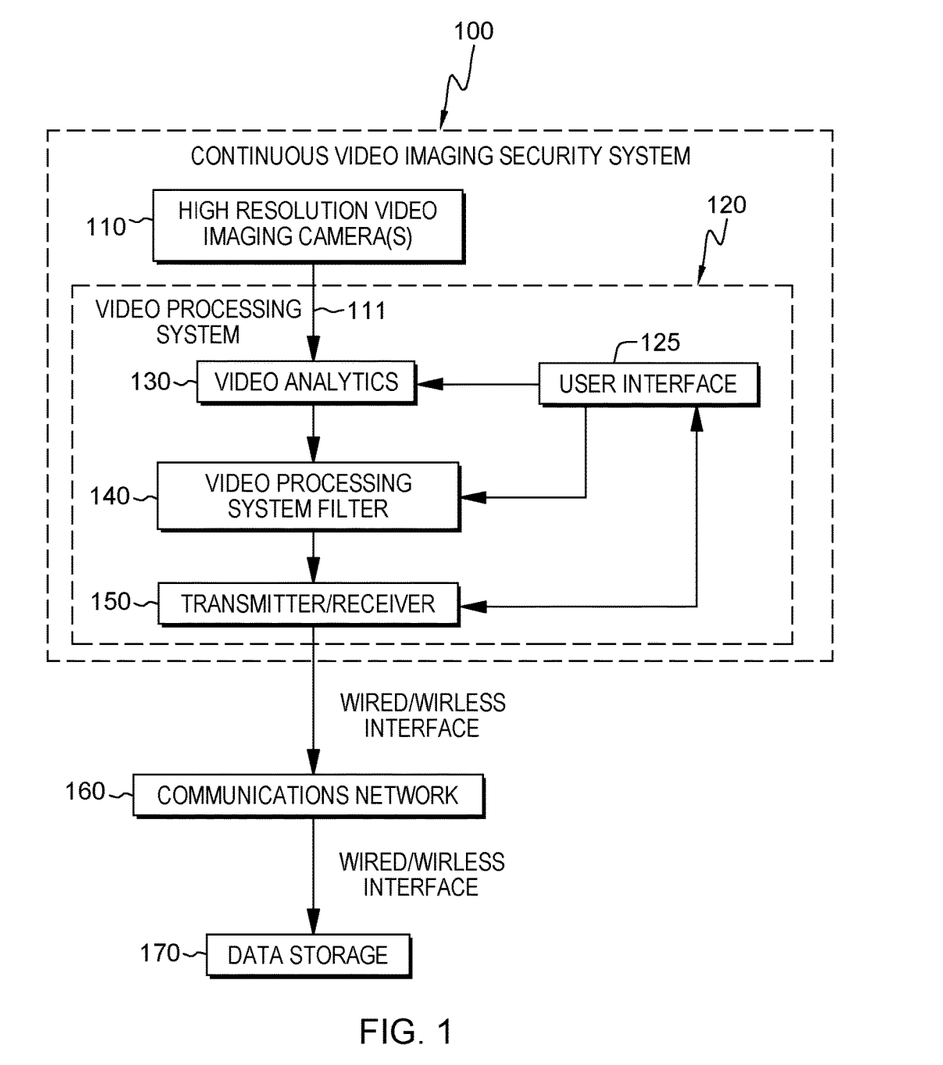
FIG. 1 depicts one embodiment of a continuous video imaging security system for generating, processing, and storing a video data stream with selected high-resolution video data segments, in accordance with one or more aspects of the present invention.

By way of further explanation, FIG. 1 depicts one embodiment of a continuous video imaging security system 100, in accordance with one or more aspects of the present invention. As illustrated, in one or more implementations, continuous video imaging security system 100 may include one or more high-resolution video imaging cameras 110, such as a 1080p HD Security Camera, as well as others. The high-resolution video imaging camera(s) 110 provides at least one continuous video data stream or feed to a video processing system 120 of the continuous video imaging security system 100. As noted, video processing system 120 may be incorporated into a common housing with the high-resolution video imaging camera(s) 110, or housed separately, either on-site or off-site from the location being monitored by the continuous video imaging security system. For instance, in one or more implementations, the video processing system may be in a separate enclosure or box connected to the high-resolution video imaging camera(s) 110 output.

As depicted in FIG. 1, in one or more embodiments, video processing system 120 may include a user interface 125, video analytics 130, a video processing system filter 140, and a transmitter/receiver 150. User interface 125 may be optional, but where present, allows (in part) a user to specify one or more parameters of the video analytics 130 and/or video processing system filter 140.

By way of example, video analytics 130 may be configured to analyze continuous video data stream 111 from high-resolution video image camera(s) 110 for one or more specified image elements of interest, and identify where at least one image element of the one or more specified image elements of interest is present in the continuous video data stream. User interface 125 may allow for user selection or customization of the specified image elements employed by the video analytics 130. Video processing system filter 140 selectively passes through one or more video segments of the continuous video data stream as high-resolution video which contain the identified image element(s) of the one or more specified image elements, and reduces resolution of other portions of the continuous video data stream than the one or more video segments to low-resolution video. In this application, low-resolution video has less data than high-resolution video, having, for instance, less pixels per frame, less lines per frame, and/or less frames per second, by way of example.

In the example of FIG. 1, transmitter/receiver 150 of video processing system 120 chronologically transfers, via wired or wireless interface and a communications network 160, the one or more video segments of the continuous video data stream of high-resolution video and the other portions of the continuous video data stream of low-resolution video for storage in a data storage 170, which may be a local, on-site data storage at the location being monitored by the security system, or alternatively, may be off-site, such as a cloud storage device.

Figure 2:
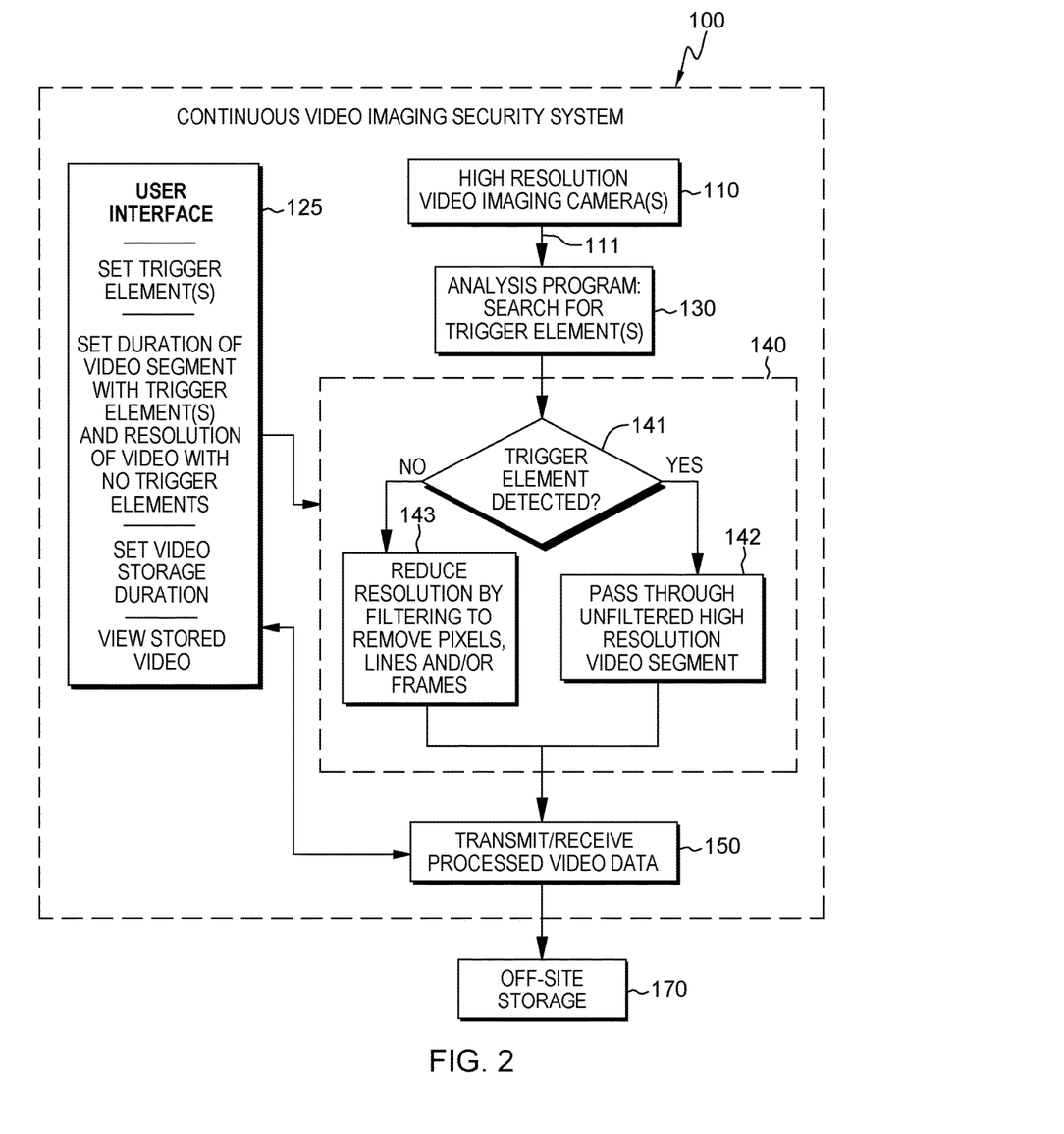
FIG. 2 depicts a more detailed embodiment of the continuous video imaging security system of FIG. 1, in accordance with one or more aspects of the present invention.

FIG. 2 is a more detailed embodiment of the continuous video imaging security system 100 of FIG. 1. As shown, continuous video data stream 111 from high-resolution video imaging camera(s) 110 is fed to video analytics 130, such as an analysis program which searches for trigger elements, such as the one or more specified image elements of interest. By way of example, the elements of interest may include a facial image, a vehicle, a license plate, a moving object, or any other element dependent upon a particular implementation of the continuous video imaging security system. For instance, the video analysis program may include facial recognition processing, moving vehicle recognition processing, license plate processing, moving object processing, etc., all of which may be implemented by those of ordinary skill in the art using available processing techniques.

As noted, in one or more implementations, continuous video imaging security system 100 may include a user interface 125 to enable a user to set the trigger element(s) used by the video analytics 130. For instance, a user may select one or more particular elements from a predefined list of specified image elements for which the analytics is capable of evaluating the continuous video data stream.

As shown in FIG. 2, in one or more embodiments, video processing system filter 140 may include processing to determine whether a trigger element has been detected 141 by the analytics, and if so, to pass through a temporarily corresponding video segment of the continuous video data stream as high-resolution video 142. This may involve passing through a defined time-segment length of high-resolution video imaging data without filtering. If no trigger element is detected, or after the video segment(s) of high-resolution video has passed through, video processing system filter 140 reduces resolution of other portions of the continuous video data stream than the one or more video segments by filtering to remove, for instance, pixels, lines and/or frames, to achieve a desired low-resolution video 143.

As mentioned, user interface 125 may be employed to set a duration of a video segment passing through as high-resolution video, as well as to set a desired resolution reduction by setting one or more filter parameters used by the filter in reducing the continuous, high-resolution video data stream to low-resolution video. The processed high-resolution, low-resolution video data may be transmitted 150 to data storage, such as off-site data storage 170. In one or more implementations, user interface 125 may enable a user to set the storage duration for the processed video data stream, for instance, 1 day, 2 days, a week, two weeks, etc. Additionally, user interface 125 may enable a user to retrieve and view the chronologically saved high-resolution, low-resolution video data from data storage 170.

Advantageously, disclosed herein is a continuous video imaging security system which allows a high-resolution video camera(s) to be employed, with the continuous high-resolution video data stream being processed by video analytics for selective pass-through and filtering of different portions of the continuous video data stream dependent on whether one or more specified image elements of interest are identified as present at a given time in the continuous video data stream. For instance, the trigger element(s) to allow for high-resolution video pass-through may be a facial image, a vehicle image, a license plate image, a moving object, or other identified item of interest for a particular location that may be useful in viewing, for instance, criminal or other questionable activity.

In one or more implementations, all incoming video of the continuous video data stream is analyzed for one or more of the specified image elements of interest. If one or more elements of interest are identified by the recognition program, then a preset or predefined amount of the continuous video data stream containing the element of interest is retained as high-resolution video, such as an established number of video frames, duration of the video data stream, etc., containing the element. Video data in the stream that is not recognized by the video analytics as containing an item of interest may be filtered or otherwise reduced in resolution, with the resultant low-resolution video remaining in the video data stream chronologically with the high-resolution video. The resultant processed video data output may be saved in chronological order by, for instance, transmitting the data across the Internet or other communications network to off-site storage for longer term retention. Advantageously, the stored video contains full chronological video data, the vast majority of which may be in low-resolution video, and particular segments of which, with identified image elements of interest, in high-resolution video.

Exemplary embodiments of computing environments to implement one or more aspects of the present invention are described below with reference to FIGS. 3-5.

Figure 3:
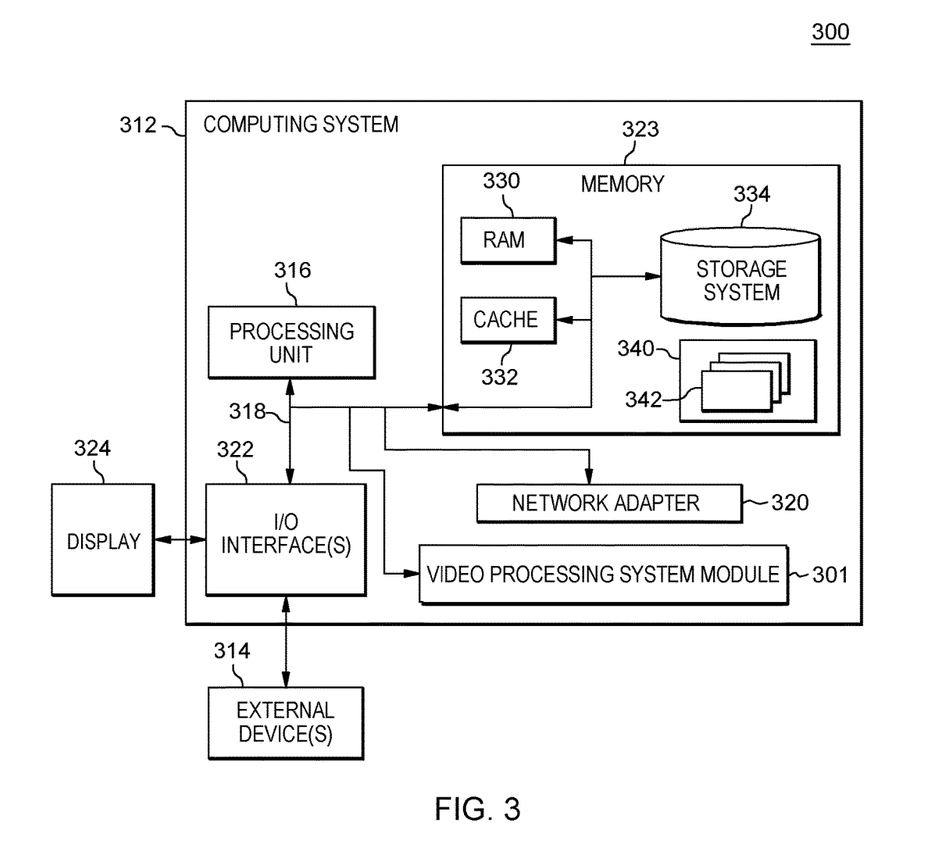
FIG. 3 depicts one embodiment of a computing system (e.g., control node of a video imaging security system) which may incorporate continuous video data stream processing, in accordance with one or more aspects of the present invention.

By way of further example, FIG. 3 depicts one embodiment of a computing environment 300, which includes a computing system 312. Examples of well-known computing systems, environments, and/or configurations that may be suitable for use with computer system 312 include, but are not limited to, a wireless computer, a handheld or laptop computer or device, a mobile phone, a programmable consumer electronic device, a tablet, a personal digital assistant (PDA), and the like.

Computing system 312 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 3, computing system 312, is shown in the form of a general-purpose computing device. The components of computing system 312 may include, but are not limited to, one or more processors or processing units 316, a system memory 323, and a bus 318 that couples various system components including system memory 323 to processor 316.

In one embodiment, processor 316 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 312 may include a variety of computer system readable media. Such media may be any available media that is accessible by computing system 312, and it includes both volatile and non-volatile media, removable and non-removable media.

System memory 323 can include computer system readable media in the form of volatile memory, such as random access memory (RAM) 330 and/or cache memory 332. Computing system 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 318 by one or more data media interfaces. As described below, memory 323 may include at least one program product having a set (e.g., at least one) of program modules that are configured to carry out the functions of embodiments of the invention.

Program/utility 340, having a set (at least one) of program modules 342, may be stored in memory 332 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. Alternatively, a separate, dependent context processing system, module, logic, etc., 301 may be provided within computing environment 312.

Computing system 312 may also communicate with one or more external devices 314 such as a keyboard, a pointing device, a display 324, etc.; one or more devices that enable a user to interact with computing system 312; and/or any devices (e.g., network card, modem, etc.) that enable computing system 312 to communicate with one or more other computing devices. Such communication can occur via Input/Output (I/O) interfaces 322. Still yet, computing system 312 can communicate with one or more networks such as a local area network (LAN), a general wide area network (WAN), and/or a public network (e.g., the Internet) via network adapter 320. As depicted, network adapter 320 communicates with the other components of computing system, 312, via bus 318. It should be understood that although not shown, other hardware and/or software components could be used in conjunction with computing system 312. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 3. Computer system/server 312 of FIG. 3 may be practiced in distributed cloud computing environments where tasks are performed by remote processing devices that are linked through a communications network. In a distributed cloud computing environment, program modules may be located in both local and remote computer system storage media including memory storage devices. Computer system/server 312 is capable of being implemented and/or performing any of the functionality set forth hereinabove.

Figure 4:
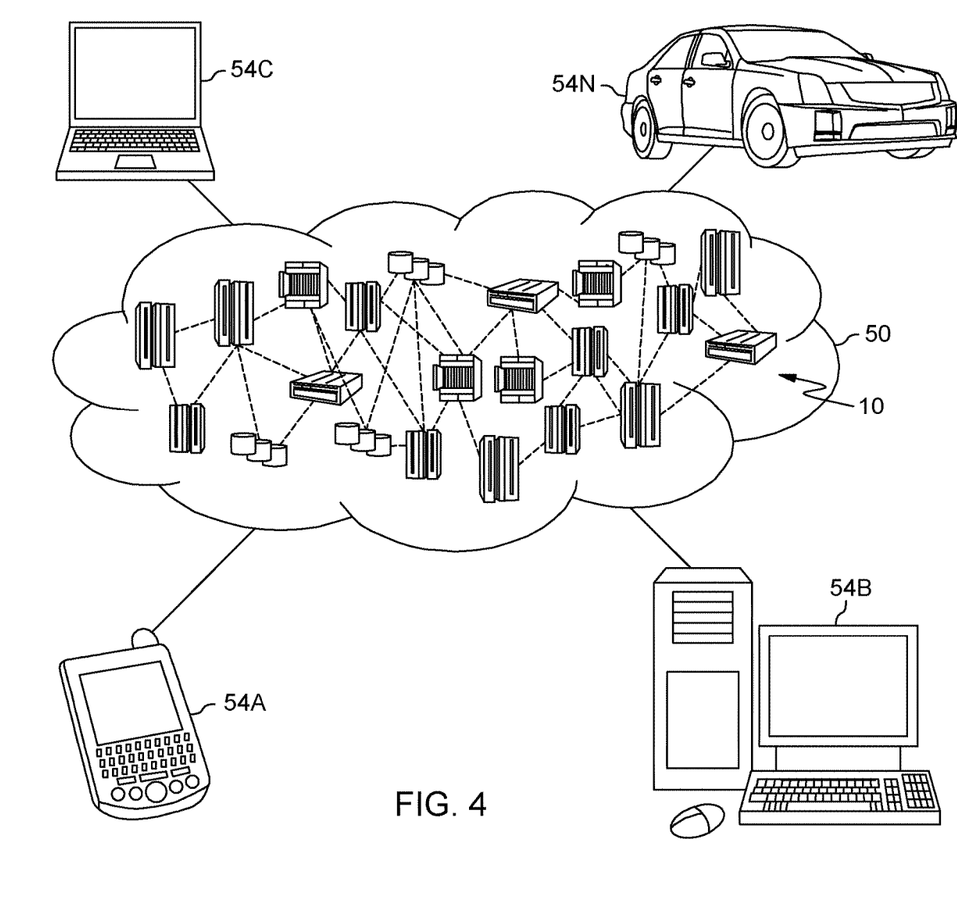
FIG. 4 depicts one embodiment of a cloud computing environment, which may facilitate implementing, or be used in association with one or more aspects of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
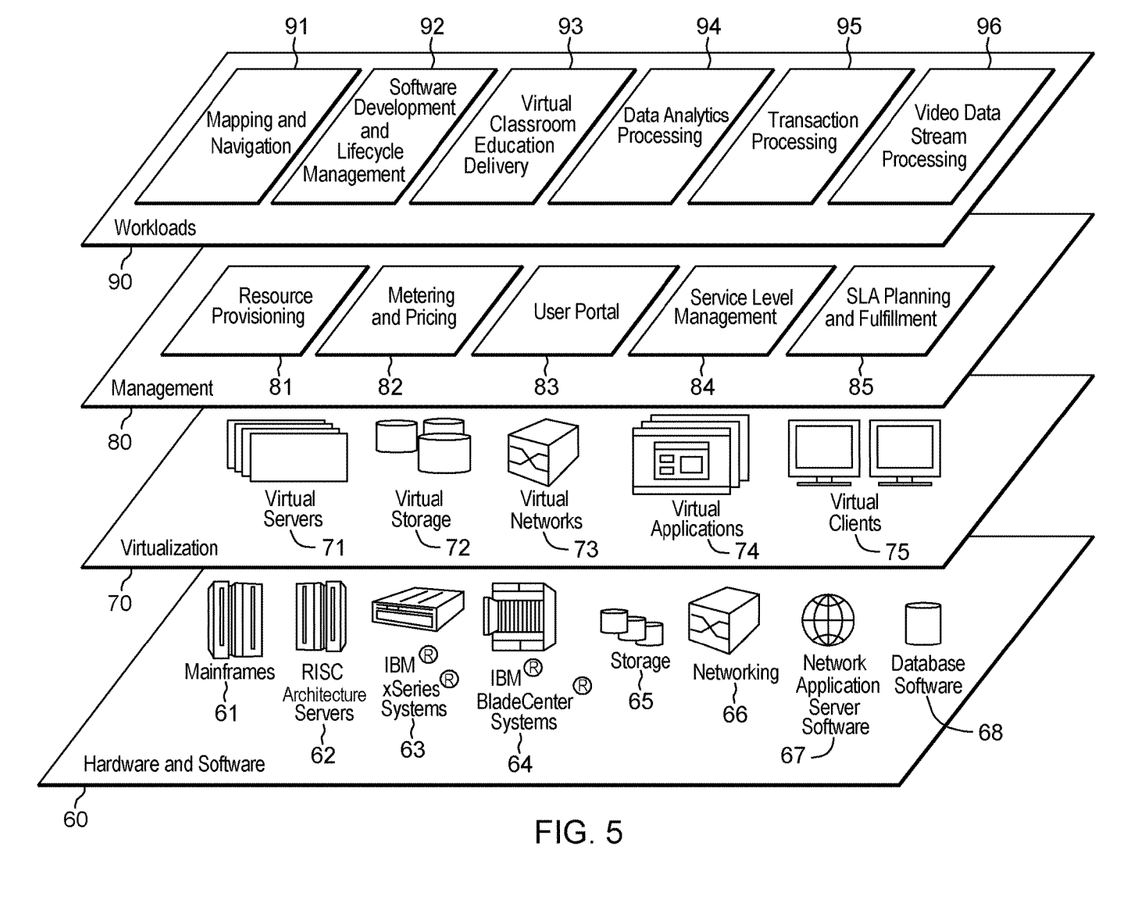
FIG. 5 depicts an example of extraction model layers, which may facilitate implementing continuous video data stream processing, in accordance with one or more aspects of the present invention.

Referring to FIG. 5, a set of functional abstraction layers provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video data stream processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
   receiving an indication of multiple types of image elements of interest, the multiple types of image elements of interest being prespecified by a user;
   receiving a continuous video data stream, the continuous video data stream being a high-resolution video data stream;
   automatically processing the continuous video data stream to facilitate storage of the continuous video data stream, the automatically processing comprising:
      analyzing, by a processor, the continuous video data stream for any of the multiple user prespecified types of image elements within the continuous video data stream;
      automatically identifying, by the processor, at least one image element of the multiple user prespecified types of image elements in the continuous video data stream;
      based on the identifying, passing through unfiltered one or more video frames of the continuous video data stream as high-resolution video, the one or more video frames containing the identified at least one image element of the multiple user prespecified types of image elements; and
      reducing, by filtering, resolution of other portions of the continuous video data stream other than the one or more video frames to low-resolution video, wherein low-resolution video includes less data than high-resolution video.

2. The computer-implemented method of claim 1, wherein the one or more video frames define one or more video segments, the one or more video segments each being of a defined duration preselected by the user.

3. The computer-implemented method of claim 2, wherein the other portions of the continuous video data stream are a majority of the continuous video data stream.

4. The computer-implemented method of claim 1, wherein the user interface further enables the user to prespecify one or more filter parameters used by the reducing resolution of the other portions of the continuous video data stream.

5. The computer-implemented method of claim 4, wherein the one or more filter parameters enable the user to prespecify a reduction in a resolution from the group consisting of a pixel resolution, a spatial resolution, a spectral resolution, and a temporal resolution, to achieve the low-resolution video.

6. The computer-implemented method of claim 1, further comprising saving chronologically the one or more video frames of the continuous video data stream as the high-resolution video and the other portions of the continuous video data stream as the low-resolution video for a storage duration.

7. The computer-implemented method of claim 6, wherein the user interface further enables the user to set the storage duration and to set an amount of filtering performed by the reducing resolution.

8. The computer-implemented method of claim 6, wherein the saving is to an off-site data storage facility remote from a video processing system performing the analyzing, automatically identifying, passing, and reducing.

9. The computer-implemented method of claim 1, wherein the user interface enables the user to preselect the one or more prespecified types of image elements from a plurality of predefined types of image elements to be used in analyzing the continuous video data stream.

10. The computer-implemented method of claim 9, wherein the one or more prespecified types of image elements comprise one or more elements selected from the group consisting of: a facial image; a vehicle; a license plate; a weapon; and an object.

11. A system for processing video data, the system comprising:
- a memory; and
- a processing unit communicatively coupled with the memory, wherein the system performs a method comprising:
  - receiving an indication of multiple types of image elements of interest, the multiple types of image elements of interest being prespecified by a user;
  - receiving a continuous video data stream, the continuous video data stream being a high-resolution video data stream;
  - automatically processing the continuous video data stream to facilitate storage of the continuous video data stream, the automatically processing comprising:
    - analyzing, by a processor, the continuous video data stream for any of the multiple user prespecified types of image elements within the continuous video data stream;
    - automatically identifying, by the processor, at least one image element of the multiple user prespecified types of image elements in the continuous video data stream;
    - based on the identifying, passing through unfiltered one or more video frames of the continuous video data stream as high-resolution video, the one or more video frames containing the identified at least one image element of the multiple user prespecified types of image elements; and
    - reducing, by filtering, resolution of other portions of the continuous video data stream other than the one or more video frames to low-resolution video, wherein low-resolution video includes less data than high-resolution video.

12. The system of claim 11, wherein the one or more video frames define one or more video segments, the one or more video segments each being of a defined duration preselected by the user.

13. The system of claim 11, wherein the user interface further enables the user to prespecify one or more filter parameters used by the reducing resolution of the other portions of the continuous video data stream.

14. The system of claim 13, wherein the one or more filter parameters enable the user to prespecify a reduction in a resolution from the group consisting of a pixel resolution, a spatial resolution, a spectral resolution, and a temporal resolution, to achieve the low-resolution video.

15. The system of claim 11, further comprising saving chronologically the one or more video frames of the continuous video data stream as the high-resolution video and the other portions of the continuous video data stream as the low-resolution video for a storage duration.

16. The system of claim 15, wherein the user interface further enables the user to set the storage duration and to set an amount of filtering performed by the reducing resolution.

17. The system of claim 15, wherein the saving is to an off-site data storage facility remote from the system performing the analyzing, automatically identifying, passing, and reducing.

18. The system of claim 11, wherein the user interface enables the user to preselect the one or more prespecified types of image elements from a plurality of predefined types of image elements to be used in analyzing the continuous video data stream.

19. A computer program product for processing a video data stream, the computer program product comprising:
- a non-transitory computer-readable storage medium readable by a processing unit and storing instructions for execution by the processing unit for performing a method comprising:
  - receiving an indication of multiple types of image elements of interest, the multiple types of image elements of interest being prespecified by a user;
  - receiving a continuous video data stream, the continuous video data stream being a high-resolution video data stream;
  - automatically processing the continuous video data stream to facilitate storage of the continuous video data stream, the automatically processing comprising:
    - analyzing, by a processor, the continuous video data stream for any of the multiple user prespecified types of image elements within the continuous video data stream;
    - automatically identifying, by the processor, at least one image element of the multiple user prespecified types of image elements in the continuous video data stream;
    - based on the identifying, passing through unfiltered one or more video frames of the continuous video data stream as high-resolution video, the one or more video frames containing the identified at least one image element of the multiple user prespecified types of image elements; and
    - reducing, by filtering, resolution of other portions of the continuous video data stream other than the one or more video frames to low-resolution video, wherein low-resolution video includes less data than high-resolution video.

20. The computer program product of claim 19, further comprising saving chronologically the one or more video frames of the continuous video data stream as the high-resolution video and the other portions of the continuous video data stream as the low-resolution video for a storage duration.

* * * * *